United States Patent [19]
Orain

[11] 4,408,806
[45] Oct. 11, 1983

[54] ARTICULATION DEVICE FOR CONNECTING A MEMBER TO A SHAFT SO THAT THE MEMBER PIVOTS AND SLIDES RELATIVE TO THE SHAFT

[75] Inventor: Meidul Orain, Conflans-Sainte-Honorine, France

[73] Assignee: Glaenzer Spicer, Poissy, France

[21] Appl. No.: 228,932

[22] Filed: Jan. 28, 1981

[30] Foreign Application Priority Data

Feb. 15, 1980 [FR] France ................................ 80 03355

[51] Int. Cl.³ ........................ F16C 19/48; F16C 25/08
[52] U.S. Cl. ...................................... 308/6 R; 308/176
[58] Field of Search ............... 308/6 C, 6 R, 6 A, 3.8, 308/176, 72, 207 R, 210, 207 A; 464/167, 168

[56] References Cited

U.S. PATENT DOCUMENTS

| | | | |
|---|---|---|---|
| 867,511 | 10/1907 | Karns | 308/176 |
| 892,096 | 6/1908 | Taylor | 308/176 |
| 1,243,049 | 10/1917 | Dewey | 308/176 |
| 3,490,251 | 1/1970 | Roethlisberger | 464/167 X |
| 3,877,251 | 4/1975 | Wahlmark | 308/176 X |
| 4,025,128 | 5/1977 | Geffner | 308/6 C |
| 4,082,374 | 4/1978 | Ernst et al. | 308/6 C |

FOREIGN PATENT DOCUMENTS 1380557 10/1964 France .

*Primary Examiner*—Stuart S. Levy
*Assistant Examiner*—Daniel P. Stodola
*Attorney, Agent, or Firm*—Wenderoth, Lind & Ponack

[57] ABSTRACT

The member (3) is mounted on the shaft (2) which has two flat faces (7), by means of an outer ring arrangement (9) of needles parallel to the axis (X—X) of the shaft and rolling along two half-moon shaped members (8) which complete the circular section of the shaft. Each half-moon shaped member has a longitudinally extending groove (13) which receives a row of needles (12) which are perpendicular to the axis (X—X) and roll along a face (7) and are maintained by a cage (18). Two springs (21) re-center the cages (18) in the course of the sliding motion.

4 Claims, 6 Drawing Figures

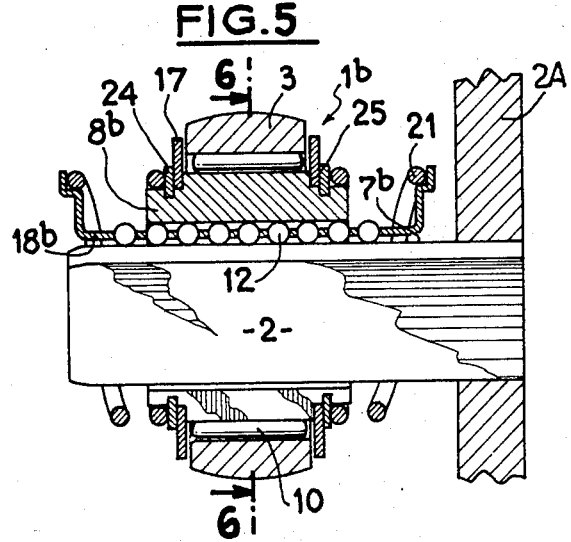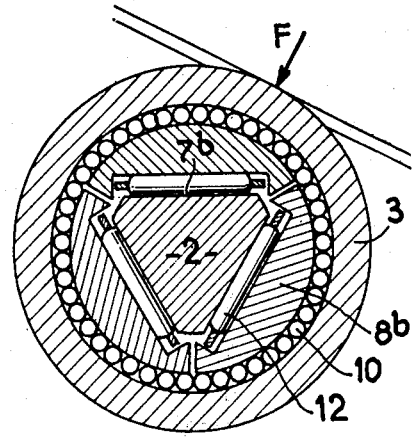

ARTICULATION DEVICE FOR CONNECTING A MEMBER TO A SHAFT SO THAT THE MEMBER PIVOTS AND SLIDES RELATIVE TO THE SHAFT

DESCRIPTION

The present invention relates to an articulation device for connecting a member to a shaft so that the member is pivotable and slidable relative to the shaft, of the type comprising an outer ring arrangement of rolling members in linear contact and parallel to the axis of the shaft, said ring arrangement being interposed between a bore in the member and an intermediate support means and inner rows of rolling members having a linear contact perpendicular to said axis, said rows being interposed between respective grooves in said support means and respective longitudinally extending raceways provided on said shaft.

These devices are advantageous when the member exerts on the shaft a considerable force since a row of rolling members having a linear contact is capable of withstanding a very high load (of the order of 50 times greater in respect of hardened chromium steel) relative to a row of the same length of balls having point contacts.

U.S. Pat. No. 3,490,251 discloses an articulation device of this type in which the intermediate support element consists of a single ring in the inner surface of which all the grooves are formed.

An object of the invention is to provide an articulation device of the same type which is easier to produce and consequently cheaper.

The invention provides an articulation device of the aforementioned type, wherein each groove is formed in a separate member having a half-moon shape.

In a very advantageous embodiment the assembly comprising the half-moon shaped members constitutes said intermediate support means in combination with a portion of the shaft, the diameter of said portion being slightly less than the diameter of the cylindrical surface of the half-moon shaped members. In this way, it is possible to reduce friction in the course of the movements in translation while a good guiding in rotation is preserved.

If the forces to be transmitted to the shaft oscillate about two privileged directions, for example two opposed directions, it is very economical to arrange that the inner assembly be formed by two rows of rolling members each of which rolls along a raceway of the shaft, these raceways facing in the two considered directions. If these forces have any direction, the inner assembly is, on the contrary, formed by at least three rows of rolling members.

Preferably, each row of the inner assembly is maintained in a cage and the cages have at their ends flanges against which springs for re-centering the cages bear, said springs being compressed between said flanges and the intermediate support means. By way of a modification, the inner assembly may be provided with a device for the re-circulation of the associated rolling members.

In any case, by the use of an intermediate support means which is longer than the bore of said member, any overhang of this member relative to the inner assembly can be eliminated.

Further features and advantages of the invention will be apparent from the ensuing description which is given merely by way of example with reference to the accompanying drawings, in which:

FIG. 5 is a longitudinal sectional view of a third embodiment of the articulation device according to the invention;

FIG. 6 is a sectional view taken on line 6—6 of FIG. 5.

Figure 2:
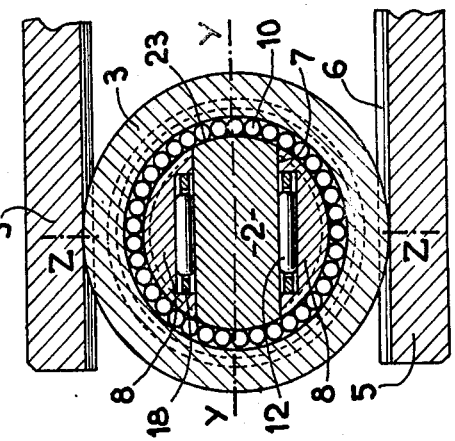
FIG. 2 is a sectional view taken on line 2—2 of FIG. 1.
Figure 1:
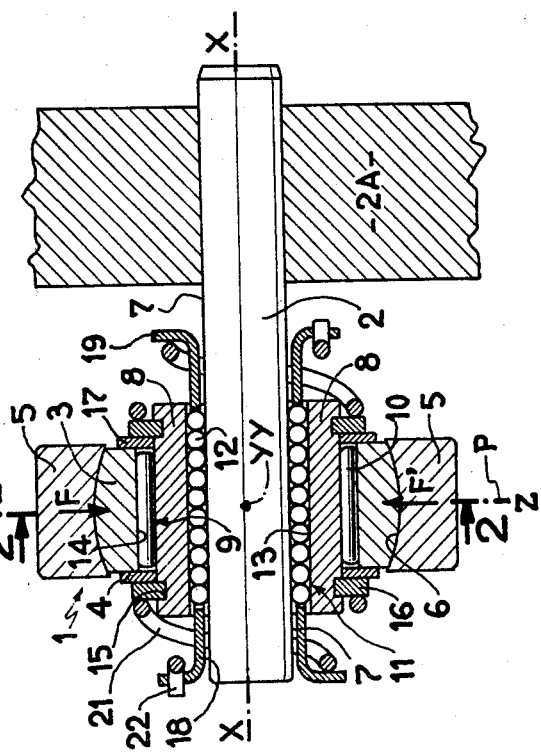
FIG. 1 is a longitudinal sectional view of an articulation device according to the invention.
Figure 3:
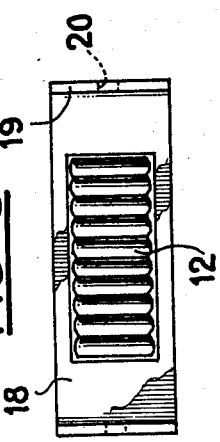

The articulation device 1 shown in FIGS. 1 and 2 is adapted to mount a spherical roller 3 on a horizontal shaft 2 which has the same axis X—X and is fixed at one end of the shaft to a vertical wall 2a so as to allow the spherical roller to slide along the axis X—X and rotate about the latter, freely, and substantially without friction, while transferring a vertical load to the shaft 2.

The roller 3, which is defined by two planar end faces 4 which are symmetrical relative to a diametral plane P perpendicular to the axis X—X, is trapped between two parallel jaws 5 of a movable member (not shown) which defines part-cylindrical runways 6 of the same diameter and whose common axis Y—Y horizontal and contained in the plane P. More precisely, with a vertical force F or F' applied to the roller 3 by the jaws 5, this roller freely rolls along one of the runways 6 corresponding to the direction of this force owing to the provision of a slight radial clearance resulting from a difference between the bore of the runways 6 and the diameter of the outer part-spherical, or substantially part-spherical, surface of the roller.

The shaft 2 has throughout its length two horizontal flat faces 7 and the device 1 has intermediate support means comprising two identical members 8 which have in section, in planes perpendicular to the axis X—X, a half-moon shape, i.e. a shape corresponding to a segment of a circle, and an outer pivotable assembly 9 comprising a ring arrangement of needles 10 parallel to the axis X—X, and a slidable assembly 11 comprising two rows of needles 12 parallel to the axis Y—Y.

As illustrated, each half-moon shaped member 8 is in fact formed by a segment of a cylinder whose length exceeds the length of the roller 3, for example double the length of the roller, the cross-sectional shape of this member 8 (FIG. 2) completing that of the shaft 2 on this corresponding side of the axis X—X. The planar face of each of the moon-shaped members adjacent the associated flat face 7, has a cavity or groove 13 throughout its length, this groove having a rectangular cross-sectional shape and receiving a row of needles 12. These needles cover a length of the shaft 2 which exceeds the length of the roller 3 and is almost equal to the length of the half-moon shaped members 8.

The assembly of the two half-moon shaped members with the corresponding part of the shaft 2 constitute an axial section of a cylindrical shaft. The outer needles 10 are interposed between the cylindrical bore 14 in the roller 3 and the median part of the outer surface of this section of a shaft on a length which is roughly equal to the length of the roller.

Figure 4:
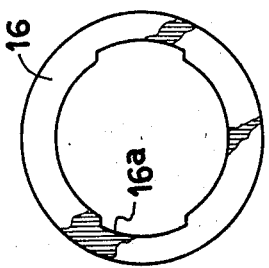
FIGS. 3 and 4 show details of this device.

The device 1 is completed by means for retaining the needles 10 and 12 and the roller 3. The half-moon shaped members 8 define at each end a circumferential groove 15 in which is engaged a ring 16 whose shape is shown in FIG. 4. The inner contour of this ring 16 is circular with, at the ends of the horizontal diameter, notches 16A whose radius corresponds to half the diameter of the shaft 2 so as to exactly fit the shape of the shaft sections 8-2-8 in the region of the groove 15. The two rings 16 axially retain the roller 3 and the needles 10 with respect to the half-moon shaped members 8 through two washers 17. These washers are optional. The rings 16 also position the half-moon shaped members 8 with respect to each other in the axial direction.

The needles 12 of each row are retained and guided by a cage 18 which has a generally planar shape and includes at each end a raised flange 19 provided with an aperture 20. Each cage 18 freely extends through the cavity 13 of the associated half-moon shaped member and, at each end of the device 1, a coil spring 21 surrounding the shaft 2 is compressed between the flange 19 of a cage 18 and the adjacent ring 16.

By way of a modification, the needles 12 may be directly guided by contact of their ends against the sides of the grooves 13 with suitable axial retaining means.

The device 1 just described allows the roller 3 to:
pivot about the axis X—X owing to the action of the needles 10;
freely slide along the axis X—X by rolling along one of the two rows of needles 12, depending on the direction of the force F or F'. In this movement, the considered row of needles rolls along the corresponding flat face 7 and travels through only one half of the travel of the roller 3. If the last-mentioned travel is short, (small reciprocation about a position of equilibrium corresponding to the plane P), the springs 21 are alternately compressed without affecting the rolling of the needles 12. If the travel is sufficiently long, one spring 21 is sufficiently compressed to re-centre the cage 18 with respect to the half-moon shaped members 8 and the movement can continue in the same direction.

Further, owing to the spherical shape of the roller 3, the jaws 5 can freely move:
in translation along the axis Y—Y;
in rotation about the vertical axis Z—Z of the roller 3.

This rotation is still further facilitated in the known manner by slightly backing off either the spherical shape of the roller 3 or the runways 6 so as to reduce the major axis of the ellipse of contact for moderate loads.

The mounting of the roller on the shaft 2 is easily carried out in the following manner:

The roller 3 is provided internally with greased needles 10 and the rings 16 (and, as the case may be, the intermediate washers 17) are placed on each end. Then one of the half-moon shaped members 8 is inserted in the assembly and applied by a radial displacement against the bore of the two rings 16 so that this bore comes practically in contact with the grooves 15 of the half-moon shaped member. Then the second half-moon shaped member is placed in position in the same way, the two notches 16a being placed in their correct position.

The greased needles 12 are then placed in position in the grooves 13 in the half-moon shaped members and then the cages 18 are inserted together in the bore, the cages being placed back to back, and the springs are mounted at each of their ends. Then the cages are radially spread apart and the assembly is radially locked by the introduction of the shaft 2. The bent outer end 22 of the spring 21 is then inserted in the two apertures 20 in the flanges 19.

It will be clear that the assembly thus achieved is perfectly reliable and can only be disassembled by withdrawing the shaft 2. Consequently, it is sufficient that the dimensioning of the component parts ensures that it is impossible to disengage this shaft in each particular application.

It can be seen that the pivot needles 10 are guided internally outside the half-moon shaped member 8 by the cylindrical part 23 of the shaft 2 and any displacement of the roller in a direction perpendicular to the axis X—X is prevented.

The diameter of this part 23 may be advantageously slightly less (0.01 to 0.1 mm, for example) than the diameter measured on the cylindrical surface of the half-moon shaped members on the axis Z—Z so as to avoid friction between the needles 10 and this part 23 in the course of the sliding motion. Further, the half-moon shaped members 8 may advantageously have their circular shape altered for the purpose of an even distribution of the thrusts exerted by the needles, as taught in French Pat. No. 1 380 557.

A slight clearance (for example 0.1 mm) is moreover provided between the flat faces 7 of the shaft 2 and the adjacent planar surface of the half-moon shaped members 8 so as to allow the free axial displacement of the half-moon shaped members along the axis X—X and avoid their friction against the shaft 2.

The simultaneous advantages provided by the pivotable and slidable articulation device 1 may be summarized as follows:
practically complete absence of friction both when pivoting and moving in translation and therefore an excellent efficiency, absence of heating when employed intensively and consequently an easy lubrication and long life;
a high load transfer capacity for a small overall size;
positive connections between the various component parts which have at the most only an extremely small clearance (of the order of 0.01 to 0.1 mm), it being possible to arrange these connections even with a pre-stressing thereof;
the component parts of the device 1 are simple and do not require specific machining operations or machines and the assembly is easy; the cost is consequently reduced bearing in mind the assured functions;
the device is reliable and strong and may be integrated in mechanisms requiring a high degree of safety.

The applications of the device 1 are many and concern not only sliding connections with rollers, but also connections other than those including rollers and generally any connection requiring at least a pivotal motion and a sliding motion relative to a shaft. The device 1 is applicable in particular to mechanisms requiring a high transfer capacity for a given weight performance and in particular to mechanisms employed in automobile vehicles.

It will be understood that it could be arranged that the wall 2A be movable, the jaws 5 being then rigid with a fixed frame or another movable element.

By way of a modification, the needles 12 may be replaced by rolling members having a barrel shape which are also perpendicular to the axis X—X. These members roll, internally, along two concave raceways having a part-circular section of the same radius provided on the shaft 2 instead of the flat faces 7, and, externally on two raceways of the same radius. The shape of the body part of the cage 18 is adapted to that of these rolling members, so as to maintain the latter exactly perpendicular to the axis X—X and thereby ensure an effective linear contact between these members and the raceways.

The device 1 described hereinbefore is designed to transfer to the shaft 2 loads having a privileged direction (vertical in the illustrated embodiments). If the load F has any direction, the device 1b shown in FIGS. 5 and 6 may be employed, this device differing from the device 1 in that the shaft 2 has three flat faces 7b so as to have an equilateral triangular cross-sectional shape with rounded corners. The needles 10 roll internally along a circular raceway defined by the assembly of the outer surfaces of three half-moon shaped members 8b similar to the half-moon shaped members 8 of FIG. 2 and each extending angularly through 120°. The assembly of the three half-moon shaped members 8b is achieved with a slight circumferential clearance therebetween (0.01 to 0.1 mm for example) by means of two circlips 24 as in the foregoing embodiment, the intermediate washers 17 being applied against radial shoulders 25 of the half-moon shaped members.

The device 1b comprises three cages 18b for retaining the needles 12. These cages are provided with needle separators and means for radially retaining the needles in both directions so that it is possible to dispose the needles 12 on a greater length than the half-moon shaped members 8b and consequently to increase the sliding travel which does not result in a re-centering under the effect of the two springs 21.

By way of a modification, instead of three raceways, the shaft 2 may have a larger number of raceways, these raceways being planar (flat faces 7) or concave.

In another modification, instead of springs for re-centering the needles 12 or the barrel-shaped members 12a, there may be employed a device for re-circulating these rolling members (not shown) in particular for applications requiring a long sliding travel.

Further, the rolling assemblies may be formed by rows of balls which are circumferential or parallel to the axis X—X, the balls rolling in grooves of the same radius formed in the adjacent members.

Having now described my invention what I claim as new and desire to secure by Letters Patent is:

1. An articulation device allowing a pivotal and sliding motion of a member on a shaft having an axis, said device comprising said shaft which defines two axially extending raceways which face in two substantially opposed directions radially of said axis for taking loads exerted on said shaft in two privileged directions, said shaft further defining two cylindrical outer surfaces which are interposed between and interconnect said two raceways, said member which defines a bore, an outer ring arrangement of rolling members which have a linear contact and are parallel to the axis of the shaft, an intermediate support means for said roling members and comprising two distinct second members in combination with said two cylindrical surfaces of the shaft, each second member having substantially the shape of a segment of a cylinder coaxial with the shaft and defining a groove, said ring arrangement of rolling members being interposed between said bore and the two second members, and inner rows of rolling members which are perpendicular to said axis, the inner rows of rolling members being interposed between and having linear contact with a respective one of said grooves in said second members and a respective one of said two axially extending raceways on the shaft, and the radius of said cylindrical surfaces of the shaft being slightly less than the radius of the cylindrical surface of the second members, whereby said cylindrical surfaces of the second members constitute raceways for the ring arrangement of rolling members and said two cylindrical surfaces of the shaft merely guide the ring arrangement of rolling members.

2. An articulation device according to claim 1, wherein the intermediate support means is longer than the bore in said member.

3. An articulation device allowing a pivotal and sliding motion of a first member on a shaft having an axis, said device comprising said shaft which defines axially extending raceways, said member which defines a bore, an outer ring arrangement of rolling members having a linear contact and parallel to the axis of the shaft, an intermediate support means for said rolling members and defining grooves, said ring arrangement of rolling members being interposed between said bore and the intermediate support means, inner rows of rolling members which are perpendicular to said axis, the inner rows of rolling members being interposed between and having linear contact with respective ones of said grooves in said support means and respective ones of said axially extending raceways on the shaft, a cage for maintaining each row of rolling members, flanges provided on opposite ends of the cages, and two springs for re-centering the cages bearing against the flanges of the cages, said springs being in compressed condition between said flanges and the intermediate support means, said intermediate support means comprising second members having in section, in planes perpendicular to said axis, a shape substantially corresponding to a segment of a circle and each groove being formed in a separate one of said second members.

4. An articulation device according to claim 3, wherein said shaft has two cylindrical outer surfaces which are interposed between and interconnect said two raceways, each of the second members is substantially a segment of a cylinder coaxial with the shaft and the second members in combination with said two cylindrical surfaces of the shaft constitute said intermediate support means, and the radius of said cylindrical surfaces of the shaft is slightly less than the radius of the cylindrical surface of the second members, whereby said cylindrical surfaces of the second members constitute raceways for the ring arrangement of rolling members and said two cylindrical surfaces of the shaft merely guide the ring arrangement of rolling members.

* * * * *